United States Patent
Bittar et al.

(10) Patent No.: US 9,638,022 B2
(45) Date of Patent: May 2, 2017

(54) SYSTEMS AND METHODS FOR DISPLAYING LOGGING DATA

(75) Inventors: Michael S. Bittar, Houston, TX (US); Martin D. Paulk, Houston, TX (US); Gary Althoff, Houston, TX (US); Paul F. Rodney, Spring, TX (US); Frode Hveding, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 2315 days.

(21) Appl. No.: 12/295,158

(22) PCT Filed: Mar. 20, 2008

(86) PCT No.: PCT/US2008/057619
§ 371 (c)(1),
(2), (4) Date: Apr. 12, 2011

(87) PCT Pub. No.: WO2008/118735
PCT Pub. Date: Oct. 2, 2008

(65) Prior Publication Data
US 2011/0175899 A1    Jul. 21, 2011

Related U.S. Application Data

(60) Provisional application No. 60/908,325, filed on Mar. 27, 2007.

(51) Int. Cl.
  *G06T 19/00*   (2011.01)
  *E21B 47/00*   (2012.01)
  *G01V 1/34*    (2006.01)

(52) U.S. Cl.
  CPC .............. *E21B 47/00* (2013.01); *G01V 1/34* (2013.01); *G06T 19/00* (2013.01)

(58) Field of Classification Search
  CPC ...... G06T 11/206; G06T 17/00; G01V 11/002
  (Continued)

(56) References Cited

U.S. PATENT DOCUMENTS 3,431,552 A    3/1969   Weeks
3,960,448 A *  6/1976   Schmidt et al. ............... 356/32
(Continued)

FOREIGN PATENT DOCUMENTS

WO   WO-2008/021868   2/2008
WO   WO-2008/076130   6/2008
(Continued)

OTHER PUBLICATIONS

International Search Report and Written Opinion, dated Aug. 1, 2008, Appl No. PCT/US2008/057619, "Systems and Methods for Displaying Logging Data", filed Mar. 20, 2008.
(Continued)

*Primary Examiner* — Edward Martello
(74) *Attorney, Agent, or Firm* — Iselin Law PLLC; Alan Bryson

(57) ABSTRACT

Borehole data presentation systems and methods that facilitate communication of volumetric logging data to a surface processing system for presentation to a driller or other user interested in visualizing the formations surrounding a borehole. The disclosed systems optionally tailor the telemetry stream to match the chosen display technique, thereby maximizing the logging system utility for the driller. Variable opacity of certain data regions or certain data discontinuities greatly facilitates data comprehension, particularly when true three-dimensional display technologies are employed. Holographic or stereoscopic display technologies may be employed to show the three-dimensional dependence of measured formation properties such as resistivity, density, and porosity. Alternatively, the radial axis can be
(Continued)

used to represent a formation parameter value, thereby enabling cylindrical cross-plots of multiple measurements. The user can control viewing position and orientation to more fully explore the three dimensional representation.

12 Claims, 7 Drawing Sheets

(58) Field of Classification Search
USPC .................................. 345/440, 419; 702/6
See application file for complete search history.

(56) References Cited

U.S. PATENT DOCUMENTS

| | | | | |
|---|---|---|---|---|
| 4,535,625 | A * | 8/1985 | Lyle, Jr. .................... | 73/152.16 |
| 4,567,759 | A * | 2/1986 | Ekstrom et al. ........... | 73/152.02 |
| 4,625,547 | A * | 12/1986 | Lyle, Jr. .................... | 73/152.05 |
| 4,677,596 | A * | 6/1987 | Lyle et al. ................. | 367/46 |
| 4,781,062 | A | 11/1988 | Taylor | |
| 5,389,881 | A | 2/1995 | Bittar et al. | |
| 5,448,227 | A | 9/1995 | Orban et al. | |
| 5,528,029 | A * | 6/1996 | Chapellat et al. .......... | 250/266 |
| 5,581,024 | A * | 12/1996 | Meyer et al. .............. | 73/152.03 |
| 5,671,136 | A | 9/1997 | Willhoit | |
| 5,821,413 | A * | 10/1998 | Chapin ..................... | 73/152.05 |
| 5,899,958 | A | 5/1999 | Dowell et al. | |
| 6,125,203 | A | 9/2000 | Keskes et al. | |
| 6,163,155 | A | 12/2000 | Bittar | |
| 6,191,586 | B1 | 2/2001 | Bittar | |
| 6,218,842 | B1 | 4/2001 | Bittar | |
| 6,255,819 | B1 * | 7/2001 | Day et al. ................. | 324/303 |
| 6,337,568 | B1 * | 1/2002 | Tutunji et al. ............. | 324/303 |
| 6,353,321 | B1 | 3/2002 | Bittar | |
| 6,359,438 | B1 | 3/2002 | Bittar | |
| 6,388,441 | B1 * | 5/2002 | Chen ........................ | 324/303 |
| 6,405,136 | B1 | 6/2002 | Li et al. | |
| 6,460,936 | B1 * | 10/2002 | Abramov et al. .......... | 299/17 |
| 6,476,609 | B1 | 11/2002 | Bittar | |
| 6,538,447 | B2 | 3/2003 | Bittar | |
| 6,665,117 | B2 | 12/2003 | Neff et al. | |
| 6,670,813 | B2 | 12/2003 | Strack | |
| 6,772,066 | B2 | 8/2004 | Cook | |
| 6,810,331 | B2 | 10/2004 | Bittar et al. | |
| 6,816,787 | B2 | 11/2004 | Ramamoorthy et al. | |
| 6,885,943 | B2 | 4/2005 | Bittar et al. | |
| 6,904,365 | B2 * | 6/2005 | Bratton et al. ............. | 702/9 |
| 6,911,824 | B2 | 6/2005 | Bittar | |
| 7,002,484 | B2 | 2/2006 | McElhinney | |
| 7,019,528 | B2 | 3/2006 | Bittar | |
| 7,027,925 | B2 | 4/2006 | Terentyev et al. | |
| 7,098,664 | B2 | 8/2006 | Bittar et al. | |
| 7,098,858 | B2 | 8/2006 | Bittar et al. | |
| 7,133,779 | B2 * | 11/2006 | Tilke et al. ............... | 702/9 |
| 7,138,803 | B2 | 11/2006 | Bittar | |
| 7,147,066 | B2 | 12/2006 | Chen et al. | |
| 7,265,552 | B2 | 9/2007 | Bittar | |
| 7,302,373 | B2 | 11/2007 | Fleury et al. | |
| 7,337,067 | B2 | 2/2008 | Sanstrom | |
| 7,340,347 | B2 | 3/2008 | Shray et al. | |
| 7,345,487 | B2 | 3/2008 | Bittar et al. | |
| 7,366,616 | B2 | 4/2008 | Bennett et al. | |
| 7,427,863 | B2 | 9/2008 | Bittar | |
| 7,483,152 | B2 * | 1/2009 | Jovancicevic et al. ........ | 356/614 |
| 7,502,026 | B2 | 3/2009 | Acosta et al. | |
| 7,557,579 | B2 | 7/2009 | Bittar | |
| 7,557,580 | B2 | 7/2009 | Bittar | |
| 7,659,722 | B2 | 2/2010 | Bittar | |
| 7,746,078 | B2 | 6/2010 | Bittar et al. | |
| 7,839,346 | B2 | 11/2010 | Bittar et al. | |
| 7,948,238 | B2 | 5/2011 | Bittar | |
| 7,982,464 | B2 | 7/2011 | Bittar et al. | |
| 8,085,050 | B2 | 12/2011 | Bittar et al. | |
| 8,174,265 | B2 | 5/2012 | Bittar | |
| 8,222,902 | B2 | 7/2012 | Bittar et al. | |
| 8,264,228 | B2 | 9/2012 | Bittar et al. | |
| 8,275,544 | B1 * | 9/2012 | Wells et al. ................. | 701/501 |
| 8,347,985 | B2 | 1/2013 | Bittar et al. | |
| 8,593,147 | B2 | 11/2013 | Bittar | |
| 2003/0065447 | A1 * | 4/2003 | Bramlett et al. ............ | 702/6 |
| 2003/0222651 | A1 * | 12/2003 | Tabanou ..................... | 324/367 |
| 2004/0158997 | A1 * | 8/2004 | Tang .......................... | 33/304 |
| 2004/0204855 | A1 * | 10/2004 | Fleury et al. ............... | 702/6 |
| 2005/0024060 | A1 | 2/2005 | Bittar | |
| 2005/0165555 | A1 | 7/2005 | Jackson | |
| 2005/0171698 | A1 | 8/2005 | Sung et al. | |
| 2005/0216197 | A1 | 9/2005 | Zamora et al. | |
| 2006/0157277 | A1 | 7/2006 | Bittar | |
| 2006/0190178 | A1 | 8/2006 | Zamora et al. | |
| 2006/0293872 | A1 | 12/2006 | Zamora et al. | |
| 2007/0213935 | A1 | 9/2007 | Fagnou et al. | |
| 2007/0235225 | A1 | 10/2007 | Bittar | |
| 2007/0255545 | A1 * | 11/2007 | Pita et al. .................. | 703/10 |
| 2008/0130407 | A1 * | 6/2008 | Akhtar ....................... | 367/9 |
| 2008/0179094 | A1 | 7/2008 | Repin et al. | |
| 2009/0278543 | A1 | 11/2009 | Beste et al. | |
| 2010/0117655 | A1 | 5/2010 | Bittar | |
| 2011/0006773 | A1 | 1/2011 | Bittar | |
| 2011/0204897 | A1 | 8/2011 | Hu et al. | |
| 2011/0251794 | A1 | 10/2011 | Bittar et al. | |
| 2012/0217008 | A1 * | 8/2012 | Moos et al. ............... | 166/250.01 |

FOREIGN PATENT DOCUMENTS

| | | |
|---|---|---|
| WO | WO-2008/118735 | 10/2008 |
| WO | WO-2010/060040 | 5/2010 |
| WO | WO-2011/123379 | 10/2011 |

OTHER PUBLICATIONS

PCT International Preliminary Report on Patentability, dated Oct. 8, 2009, PCT Appl No. US2008/057619, "Systems and Methods for Displaying Logging Data", filed Mar. 20, 2008, 9 pgs.

PCT International Search Report and Written Opinion, dated Jan. 5, 2009, Appl No. PCT/US08/84006, "Data Transmission Systems and Methods for Azimuthally Sensitive Tools with Multiple Depths of Investigation" filed Nov. 19, 2008, 10 pgs.

US Non-Final Office Action, dated Jun. 10, 2013, U.S. Appl. No. 12/808,193, "Data Transmission Systems and Methods for Azimuthally Sensitive Tools with Multiple Depths of Investigation", filed Jun. 15, 2010, 22 pgs.

US Non-Final Office Action, dated Jan. 30, 2014, U.S. Appl. No. 12/808,193, "Data Transmission Systems and Methods for Azimuthally Sensitive Tools with Multiple Depths of Investigation" filed Jun. 15, 2010, 20 pgs.

* cited by examiner

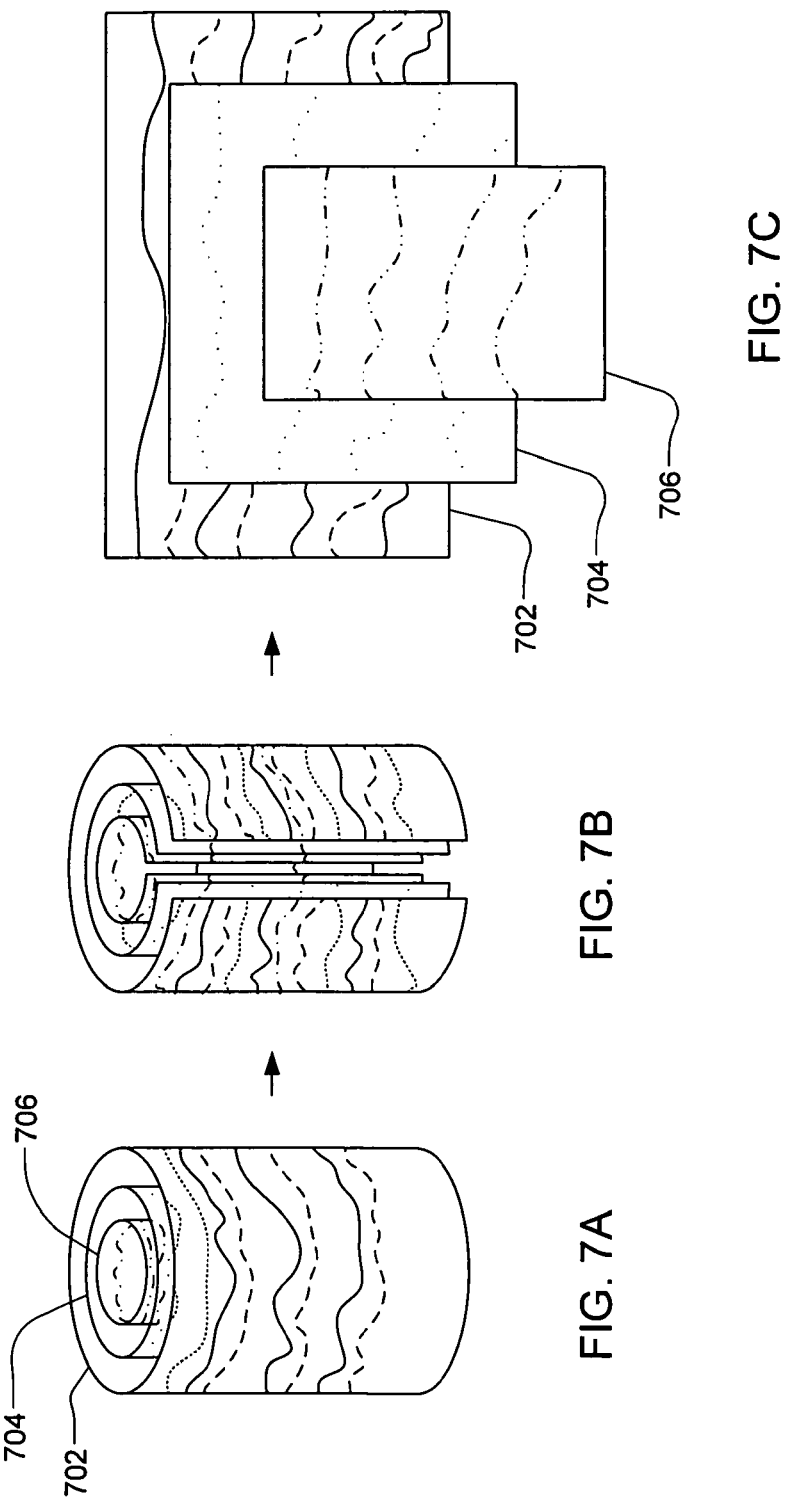

SYSTEMS AND METHODS FOR DISPLAYING LOGGING DATA

RELATED APPLICATIONS

The present application claims priority to Provisional U.S. Patent Application 60/908,325, entitled "Borehole Data Presentation Systems and Methods" and filed Mar. 27, 2007.

BACKGROUND

Modern oil field operators demand access to a great quantity of information regarding the parameters and conditions encountered downhole. Such information typically includes characteristics of the earth formations traversed by the borehole and data relating to the size and configuration of the borehole itself. The collection of information relating to conditions downhole, which commonly is referred to as "logging," can be performed by several methods including wireline logging and "logging while drilling" (LWD).

In wireline logging, a probe or "sonde" is lowered into the borehole after some or all of the well has been drilled. The sonde hangs at the end of a long cable or "wireline" that provides mechanical support to the sonde and also provides an electrical connection between the sonde and electrical equipment located at the surface of the well. In accordance with existing logging techniques, various parameters of the earth's formations are measured and correlated with the position of the sonde in the borehole as the sonde is pulled uphole.

In LWD, the drilling assembly includes sensing instruments that measure various parameters as the formation is being penetrated, thereby enabling measurements of the formation while it is less affected by fluid invasion. While LWD measurements are desirable, drilling operations create an environment that is generally hostile to electronic instrumentation, telemetry, and sensor operations.

In these and other logging environments, measured parameters are usually recorded and displayed in the form of a log, i.e., a two-dimensional graph showing the measured parameter as a function of tool position or depth. In addition to making parameter measurements as a function of depth, some logging tools also provide parameter measurements as a function of azimuth. Such tool measurements have often been displayed as two-dimensional images of the borehole wall, with one dimension representing tool position or depth, the other dimension representing azimuthal orientation, and the pixel intensity or color representing the parameter value. See, e.g., B. Montaron, U.S. Pat. No. 5,519,668.

Recently, however, improved logging tools have been developed that can measure one or more formation parameters as a function of distance from the borehole axis, as well as depth and azimuth. See, e.g., M. Bittar, U.S. patent application Ser. No. 11/835,619, entitled "Tool for azimuthal resistivity measurement and bed boundary detection". Such additional information would provide very helpful insight to drillers and other users of log information. However, as tool measurements extend further into the formations surrounding the borehole, the traditional telemetry and data presentation methods are increasingly unable to meaningfully convey such additional information.

BRIEF DESCRIPTION OF THE DRAWINGS

A better understanding of the various disclosed embodiments can be obtained when the following detailed description is considered in conjunction with the following drawings, in which:

FIGS. 7A-7D show variations of a view based on rendering nested cylindrical surfaces;

Figure 1:
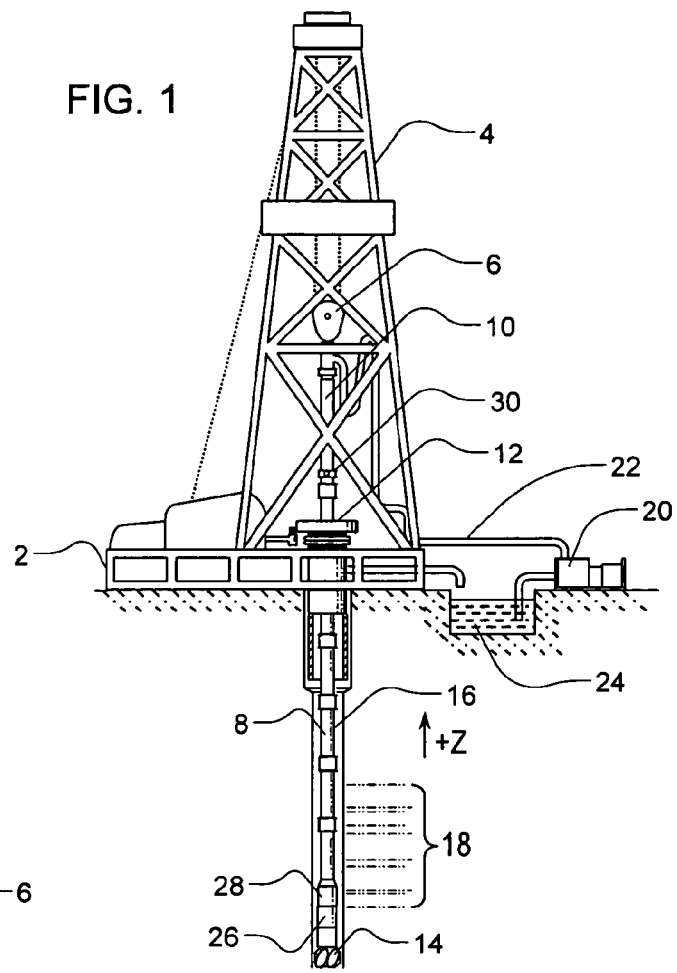
FIG. 1 is an illustrative environment for logging while drilling ("LWD")

While the invention is susceptible to various modifications and alternative forms, specific embodiments thereof are shown by way of example in the drawings and will herein be described in detail. It should be understood, however, that the drawings and detailed description thereto are not intended to limit the invention to the particular illustrated embodiments, but on the contrary, the intention is to cover all modifications, equivalents and alternatives falling within the spirit and scope of the present invention as defined by the appended claims.

DETAILED DESCRIPTION

Accordingly, there are disclosed herein various borehole data presentation systems and methods that facilitate communication of volumetric logging data to a surface processing system for presentation to a driller or other user interested in visualizing the formations surrounding a borehole. The disclosed systems optionally tailor the telemetry stream to match the chosen display technique, thereby maximizing the logging system utility for the driller. Variable opacity of certain data regions or certain data discontinuities greatly facilitates data comprehension, particularly when true three-dimensional display technologies are employed. Holographic or stereoscopic display technologies may be employed to show the three-dimensional dependence of measured formation properties such as resistivity, density, and porosity. Alternatively, the radial axis can be used to represent a formation parameter value, thereby enabling cylindrical cross-plots of multiple measurements. The user can control viewing position and orientation to more fully explore the three dimensional representation.

The disclosed systems and methods are best understood in the context of the larger systems in which they operate. FIG. 1 shows an illustrative logging while drilling (LWD) environment. A drilling platform 2 supports a derrick 4 having a traveling block 6 for raising and lowering a drill string 8. A kelly 10 supports the drill string 8 as it is lowered through a rotary table 12. A drill bit 14 is driven by a downhole motor and/or rotation of the drill string 8. As bit 14 rotates, it creates a borehole 16 that passes through various formations 18. A pump 20 circulates drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole into the pit 24 and aids in maintaining the borehole integrity.

An LWD tool 26 is integrated into the bottom-hole assembly near the bit 14. As the bit extends the borehole through the formations, logging tool 26 collects measurements relating to various formation properties as well as the tool orientation and various other drilling conditions. The logging tool 26 may take the form of a drill collar, i.e., a thick-walled tubular that provides weight and rigidity to aid the drilling process. A telemetry sub 28 may be included to transfer tool measurements to a surface receiver 30 and to receive commands from the surface. In some embodiments, the telemetry sub 28 does not communicate with the surface, but rather stores logging data for later retrieval at the surface when the logging assembly is recovered. In both approaches, limitations are placed on the amount of data that can be collected and stored or communicated to the surface.

Figure 2:
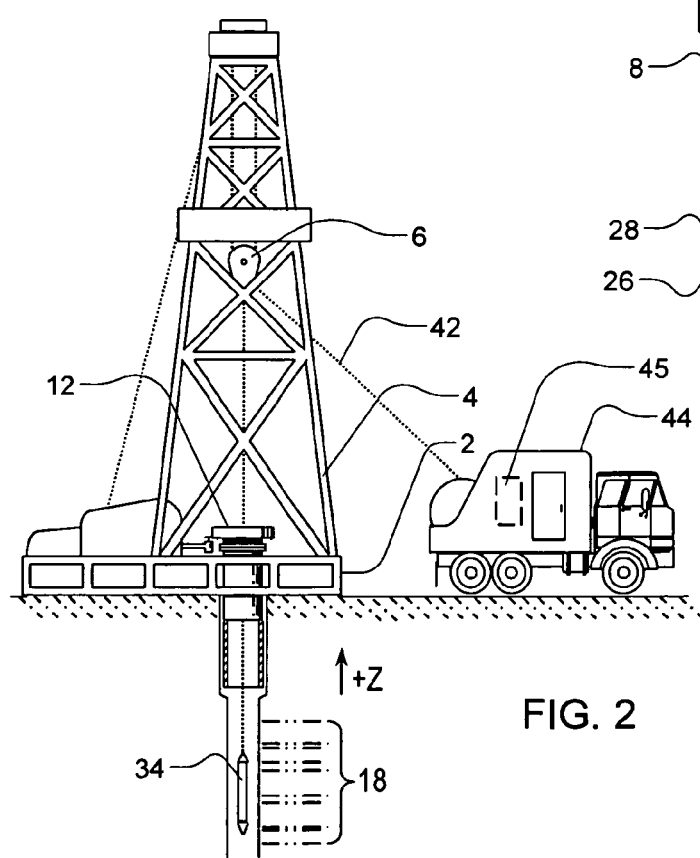
FIG. 2 is an illustrative environment for wireline logging.

At various times during the drilling process, the drill string 8 may be removed from the borehole as shown in FIG. 2. Once the drill string has been removed, logging operations can be conducted using a wireline logging tool 34, i.e., a sensing instrument sonde suspended by a cable 42 having conductors for transporting power to the tool and telemetry from the tool to the surface. A wireline logging tool 34 may have pads and/or centralizing springs to maintain the tool near the axis of the borehole as the tool is pulled uphole. A logging facility 44 collects measurements from the logging tool 34, and includes a computer system 45 for processing and storing the measurements gathered by the logging tool.

Figure 3:
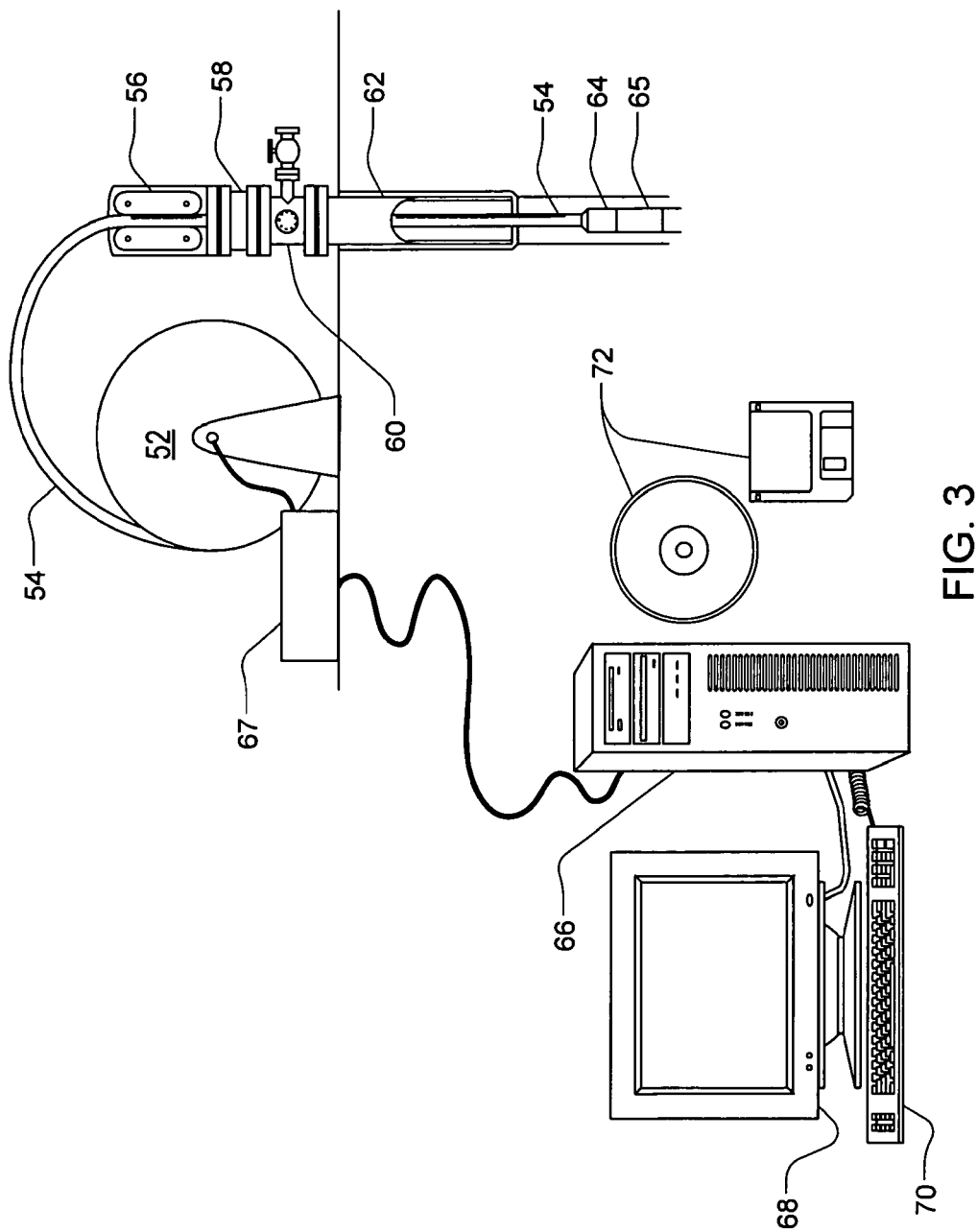
FIG. 3 is an illustrative environment for tubing-conveyed logging.

Tubing-conveyed logging is an alternative to wireline logging. FIG. 3 shows an illustrative tubing-conveyed logging system in which composite tubing 54 is pulled from a spool 52 by a tubing injector 56 and injected into a well through a packer 58 and a blowout preventer 110. In the well, a supervisory sub 64 and one or more logging tools 65 are coupled to the composite tubing 54 and configured to communicate to a surface computer system 66 via information conduits embedded in the composite tubing 54. A power supply 67 may be provided to supply power to logging tool 64 via power conduits in composite tubing 54.

Surface computer system 66 is configured to communicate with supervisory sub 64 to set logging parameters and collect logging information from the one or more logging tools 65. Surface computer system 66 is preferably configured by software (shown in FIG. 3 in the form of removable storage media 72) to monitor and control downhole instruments 64, 65. System 66 includes a display device 68 and a user-input device 70 to allow a human operator to interact with the system control software 72.

In each of the foregoing logging environments, the logging tool assemblies preferably include a navigational sensor package that includes directional sensors for determining the inclination angle, the horizontal angle, and the rotational angle (a.k.a. "tool face angle") of the BHA 26. As is commonly defined in the art, the inclination angle is the deviation from vertically downward, the horizontal angle is the angle in a horizontal plane from true North, and the tool face angle is the orientation (rotational about the tool axis) angle from the high side of the wellbore. In accordance with known techniques, wellbore directional measurements can be made as follows: a three axis accelerometer measures the earth's gravitational field vector relative to the tool axis and a point on the circumference of the tool called the "tool face scribe line". (The tool face scribe line is typically drawn on the tool surface as a line parallel to the tool axis.) From this measurement, the inclination and tool face angle of the BHA can be determined Additionally, a three axis magnetometer measures the earth's magnetic field vector in a similar manner From the combined magnetometer and accelerometer data, the horizontal angle of the BHA may be determined.

Moreover, the logging tool assemblies in each of the foregoing environments preferably includes a logging instrument that, alone or in combination with other instruments, measures at least one formation parameter as a function of tool depth (or position along the borehole), azimuth, and radial distance from the borehole axis. Such measurements may be made, e.g., by an azimuthally sensitive resistivity logging tool having multiple depths of investigation. Other suitable logging tools may include a "borehole radar" assembly that detects reflections of high-frequency electromagnetic waves, or ultrasonic imaging tools that similarly detect reflections of acoustic impulses. Certain proposed nuclear logging tools will also provide formation property measurements as a function of position, azimuth, and radial distance. Of course, data from multiple tools can also be combined to further characterize formation properties.

As such logging tools progress along the borehole, they rotate, employ an azimuthally-distributed array, and/or direct azimuthally-steerable sensors to collect measurements as a function of azimuth and radial distance. In some system embodiments (e.g., wireline logging sondes that do not move too quickly), all of the logging data can be conveyed to the surface as it is collected. Such information can be quite valuable to enable the driller to steer the borehole with respect to bed boundaries and/or other boreholes, thereby (e.g.) increasing path lengths through the payzone. However, in environments like the LWD environment of FIG. 1, the telemetry channel bandwidth may be quite limited. Limits may be imposed by the use of mud pulse telemetry, electromagnetic wave telemetry, and acoustic telemetry. Under such constraints it is desirable to communicate sufficient information to the surface for a driller to visualize the logging measurements, while storing the remaining information in memory until the tool can be retrieved or pauses occur in data acquisition.

The remaining discussion concerns the communication and visualization of formation parameters that are measured in terms of a three-dimensional coordinate system such as depth, azimuthal angle, and radial distance, or some other coordinate system having three independent dimensions along which data can vary relative to the borehole. Such data is herein termed "volumetric data". Although various visualization techniques may be employed at the surface, the greatest communication efficiencies result when the downhole tool is configured to communicate the data most suited for the chosen visualization technique.

Accordingly, the visualization technique is preferably chosen and communicated to the downhole tool before logging and telemetry data transmission begins. In some embodiments, the visualization technique may be changed after logging has begun and the change communicated to the logging tool for future telemetry transmission. The system user selects and communicates to the tool various visualization parameters such as bin size (and positions), parameter value resolution (e.g., number of bits to represent), and visualization type. Various visualization types are discussed further below, including parameter value rendering with color and/or transparency, and parameter gradient rendering with color and/or transparency.

Each visualization type can be displayed using different visualization geometries, including tube, sectioned solids, concentric shells, unwrapped cylinders, and axially flattened cylinders. Different viewing techniques can be used in conjunction with these geometries to aid in understanding the three dimensional distribution of the data. Illustrative viewing techniques employ time-variation such as moving viewpoints, layers having periodically varying transparency, and changing cross-sections. Before discussing visualization approaches in detail, we discuss the effects of pre-selecting visualization parameters on communication.

When faced with constraints on the bandwidth of the telemetry channel, communication of volumetric data to the surface for real-time visualization must be done efficiently. A number of data compression approaches can be taken to communicate some likeness of the volumetric data to the surface. For example, in some logging system embodiments, the data may be acquired at high resolution so as to have a bin size of one inch along the borehole axis by fifteen degrees of azimuth by two inches of radial distance, yielding 5184 parameter measurements per borehole foot. For real-time visualization purposes, the data may be transmitted at a lower resolution, having a bin size of four inches along the borehole axis by 45 degrees of azimuth by eight inches of radial distance so as to yield 108 parameter measurements per borehole foot. To form the low resolution data, the logging tool may average the parameter measurements for 48 high resolution bins (corresponding to one low-resolution bin) together, or alternatively, may simply select one of the 48 high resolution bin measurements as the measurement for the low resolution bin.

Another compression technique involves transmitting an initial measurement value, and then transmitting subsequent measurement values as differences or "deltas" relative to the preceding value. Because adjacent measurements are often highly correlated, the number of bits needed to represent such deltas is much smaller than the number of bits needed to represent the initial measurement. At the surface, the measurement values can be reconstructed by adding each delta to the preceding measurement. To prevent transmission errors from unduly corrupting the measurements, the process is re-initiated periodically with the transmission of a new initial value.

When parameter value gradients or discontinuities are of particular interest, the logging tool may transmit only such values, omitting the initial measurement values discussed previously. Moreover, the logging tool may categorize the deltas into just a few categories such that, e.g., only one or two bits are required for each delta value.

In some visualization techniques discussed below, only certain parameter values or ranges (or only certain delta ranges) will be shown. The transmission of data for such visualization techniques may simply identify the bins containing parameter values (or associated with delta values) in the desired range.

Figure 4:
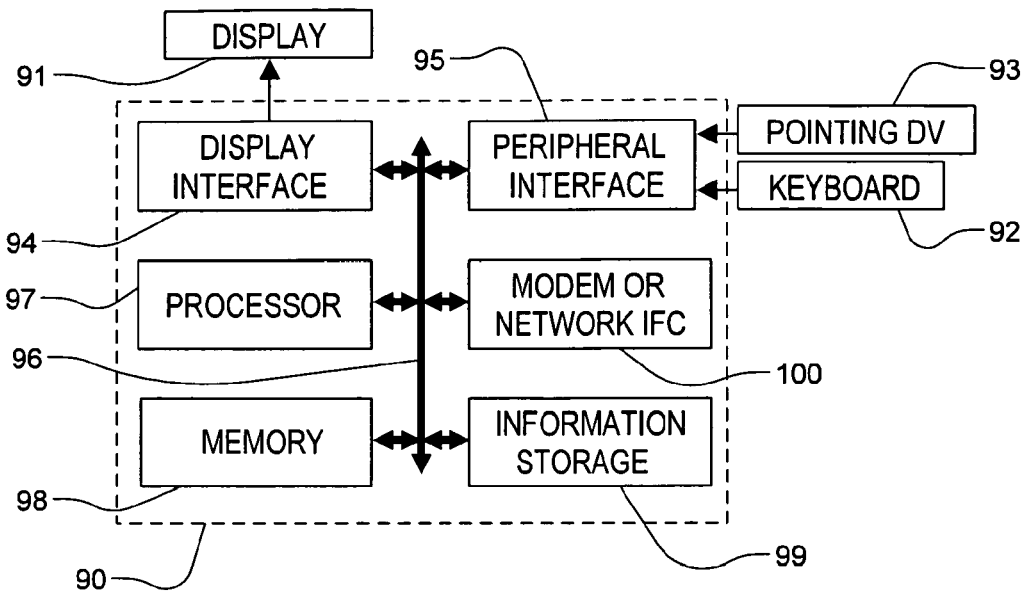
FIG. 4 is a block diagram of an illustrative logging data analysis system.

FIG. 4 shows a block diagram of an illustrative computer system suitable for collecting volumetric logging data and generating visualizations thereof. The computer of FIG. 4 includes a chassis 90, a display 91, and one or more input devices 92, 93. The chassis 90 is coupled to the display 91 and the input devices 92, 93 to interact with a user. The display 91 and the input devices 92, 93 together operate as a user interface. The display 91 often takes the form of a video monitor, but may take many alternative forms suitable for generating three dimensional visualizations. The input device 92 is shown as a keyboard, but may similarly take many alternative forms such as pointing devices, joysticks, buttons, motion sensors, a keypad, a camera, a microphone or other means for receiving information from a user.

Located in the chassis 90 is a display interface 94, a peripheral interface 95, a bus 96, a processor 97, a memory 98, an information storage device 99, and a network interface 100. The display interface 94 may take the form of a video card or other suitable interface that accepts information from the bus 96 and transforms it into a form suitable for display 91. Conversely, the peripheral interface may accept signals from input devices 92, 93 and transform them into a form suitable for communication on bus 96. Bus 96 interconnects the various elements of the computer and transports their communications.

Processor 97 gathers information from the other system elements, including input data from the peripheral interface 95 and program instructions and other data from the memory 98, the information storage device 99, or from a remote location via the network interface 100. (The network interface 100 enables the processor 97 to communicate with remote systems via a wired or wireless network.) The processor 97 carries out the program instructions and processes the data accordingly. The program instructions may further configure the processor 97 to send data to other system elements, including information for the user, which may be communicated via the display interface 94 and the display 91.

The processor 97, and hence the computer as a whole, generally operates in accordance with one or more programs stored on an information storage device 99. One or more of the information storage devices may store programs and data on removable storage media such as a floppy disk or an optical disc. Whether or not the information storage media is removable, the processor 97 may copy portions of the programs into the memory 98 for faster access, and may switch between programs or carry out additional programs in response to user actuation of the input device. The additional programs may be retrieved from information the storage device 99 or may be retrieved from remote locations via the network interface 100. One or more of these programs configures the computer to carry out at least one of the visualization methods disclosed herein.

Figure 5A:
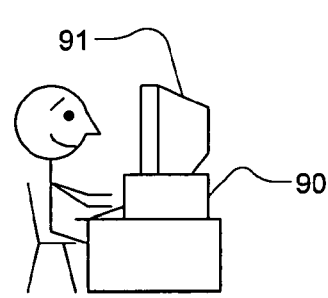
FIGS. 5A-5D show various three-dimensional visualization technologies.

FIGS. 5A-5D show illustrative examples of suitable three-dimensional visualization technologies. In FIG. 5A monitor 91 takes the form of a conventional video display on which the volumetric data is shown in a perspective view with rotation, varying transparency, or some other form of time variation to convey the contents of the thee-dimensional data space.

Figure 5B:
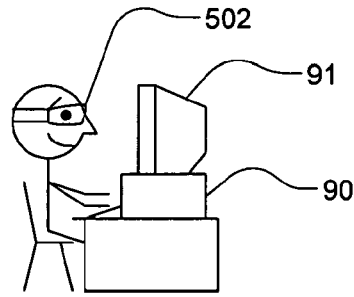

In FIG. 5B, the conventional video display renders a stereoscopic image, with a view for each eye. Viewing glasses 502 may be employed as an aid to exposing the appropriate image to each eye. For example, the left and right views presented on monitor 91 may alternate at (say) 30 Hz, and the lenses in the viewing glasses may alternate in opacity at the same rate. Alternatively, the left and right views may be overlaid, but presented in complementary colors such as red and green, and the lenses of the viewing glasses may be provided with the complementary colors to pass only the appropriate images. As yet another example, the stereoscopic images may be presented side by side on the monitor, and the viewing glasses 502 may be equipped with optics to shift each image into alignment with the appropriate eye. Other stereoscopic technologies exist and may be employed.

Figure 5C:
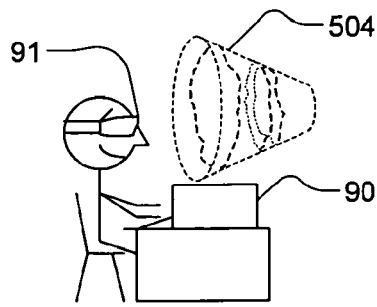

For example, in FIG. 5C, display 91 takes the form of display goggles that directly display to each eye the appropriate view of a stereoscopic image. Together the views create a three-dimensional visualization such as the "traveling tube" image 504 shown in broken outline. In a traveling tube image, the viewer can travel back and forth along the borehole axis and perceive visual representations of the volumetric data surrounding the borehole at the radial distance corresponding to the radius of the tube. As the viewer wishes to see deeper into the formation surrounding the borehole, the viewer alters the diameter of the tube. In some embodiments, the convergence point of the visualization may be shifted forward to enhance the viewer's perspective on the data, making the tube appear more conical than cylindrical.

Figure 5D:
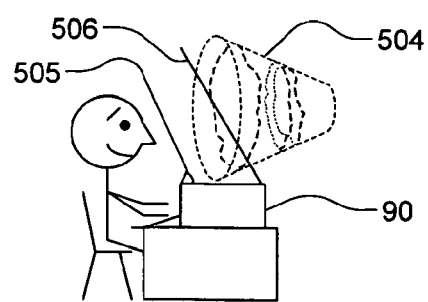

In FIG. 5D, a holographic three-dimensional visualization 504 is presented by a holographic projector 505 via a reflector 506. Various projection systems for computer-generated holograms (CGH) are known and may be used. See, e.g., R. I. Young, U.S. Pat. No. 7,161,721, "Computer Generated Holograms", and references cited therein. Holographic projection permits a more natural, less encumbered, viewing experience to the user.

Figure 6:
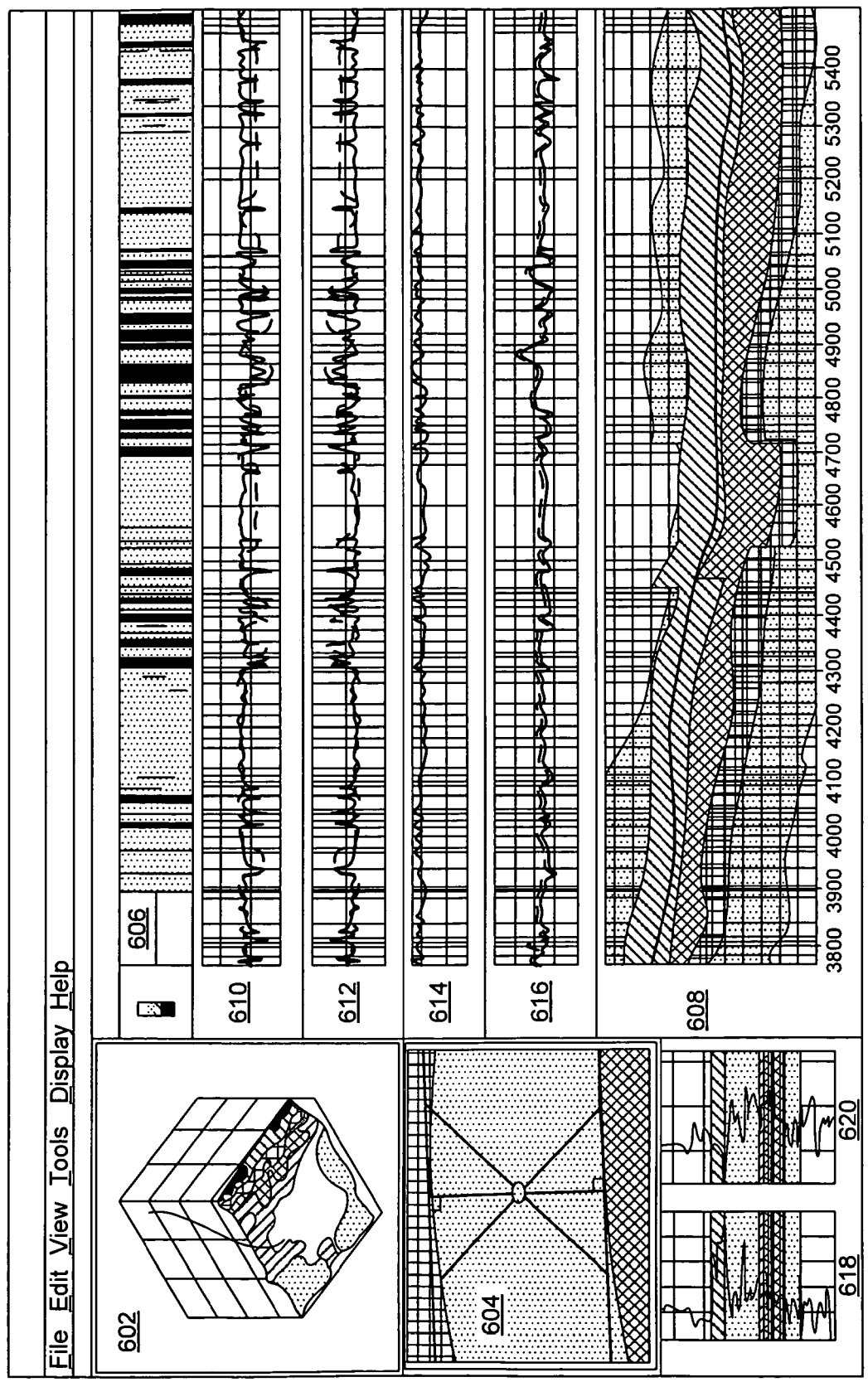
FIG. 6 is an illustrative integrated logging data display.

FIG. 6 shows an integrated view that includes three-dimensional visualizations and various data logs to aid the drilling process. The integrated view includes a perspective view 602, a steering view 604, a borehole wall view 606, a formation cross-section view 608, and various formation parameter logs as a function of horizontal position 610-616 and as a function of depth 618-620. Perspective view 602 shows a seismic data cube that omits all data except for a selected formation bed. The formation bed surface is painted in colors indicating the value of a selected formation parameter. The perspective view also shows the measured track of the borehole. Perspective view 602 may be replaced with a three-dimensional image using, e.g., stereoscopic or holographic techniques.

Steering view 604 shows a vertical cross-section of the formation as viewed in the direction that the borehole is being drilled. The cross-section is colored to identify the various formation beds. A circle indicates the relative size and placement of the borehole, and directional drilling lines indicate the directions in which the drilling direction can be changed. The steering view may be rendered in three dimensions with surfaces indicating bed boundaries and a line extending in the current drilling direction.

Borehole wall view 606 displays a formation parameter (e.g., resistivity) as a function of azimuth and horizontal extent. The radial depth at which the parameter value is represented can be varied at will.

Formation cross-section view 608 shows a vertical cross-section of the formation taken along the borehole axis. As with the steering view, the formation cross-section is colored to identify the various formation beds. A semi-transparent overlay is provided to show the predicted pay zone. The borehole path is also shown. When rendered in three dimensions, the transverse deviations of the borehole path and vertical cross-section can also be shown.

In contrast with existing logging systems and methods that provide two-dimensional borehole data images representing a parameter as a function of azimuth and depth, the presently disclosed systems provide three-dimensional borehole data views representing a parameter as a function of three independent dimensions such as azimuth, depth, and radial distance. This set of dimensions may be likened to a cylindrical coordinate system, though differences exist because the borehole axis is generally not a straight line. It is contemplated that at least the following parameters can be measured and represented as three-dimensional data around a borehole: resistivity, resistive anisotropy, acoustic slowness, acoustic anisotropy, directional permeability, porosity, formation stress, formation shaliness, cementation, borehole caliper, borehole shape, and invasion profiles. Derivable from such data and also of interest are selected parameter value ranges, parameter gradients, discontinuities, and time-lapse changes.

A large number of visualizations are possible. FIG. 7A shows the data as a set of concentric shells 702-706, with color at each point on the shell to represent the corresponding parameter values. The concentric shells may be positioned at selected depths of investigation. Alternatively, the shell radius may reflect selected parameter values, e.g., selected values of resistivity, density, porosity, and natural gamma count rate. As one example, the innermost shell represents a range of low values, the intermediate shell represents a range of medium values, and the outermost shell represents a range of large values. Of course, additional shells can be used and the low-to-high trend can be reversed. The pixels on a given shell can simply be rendered opaque if measurements in that parameter value range are detected, and transparent if they are not. (The resulting view is sometimes called a "lathe" view, because it often resembles an object being turned on a lathe.) However, rather than simply showing a single parameter, the user may choose instead to set the opacity or color of cylindrical shell pixels to reflect a different parameter, thereby obtaining a cylindrical cross-plot. As one example, the radius represents porosity, the opacity represents resistivity, and color represents gamma counts.

Figure 7D:
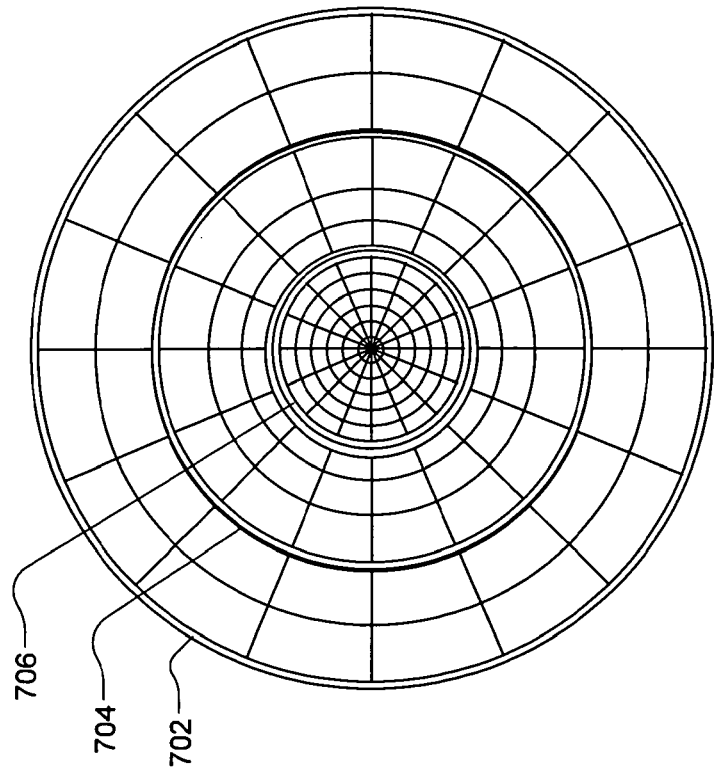

In FIG. 7A, the color represents deviations of the parameter value from the average value, and the outer shells 702-704 are partially transparent to allow some of the inner shell data to be viewed. FIG. 7B shows the shells being split along a line parallel to the borehole axis to enable "unrolling" of the shells as shown in FIG. 7C. FIG. 7D shows an end-on view of the concentric shells. Each of these views can be provided as a three-dimensional visualization to assist the viewer's intuitive understanding of the spatial relationships in the data. A greater or lesser number of shells may be shown as the data permits. The visualization may "scroll" so that the user's viewpoint travels along the borehole at a speed and direction that the user controls. The user may control the viewing position and direction or allow the computer to select these automatically.

Figure 8:
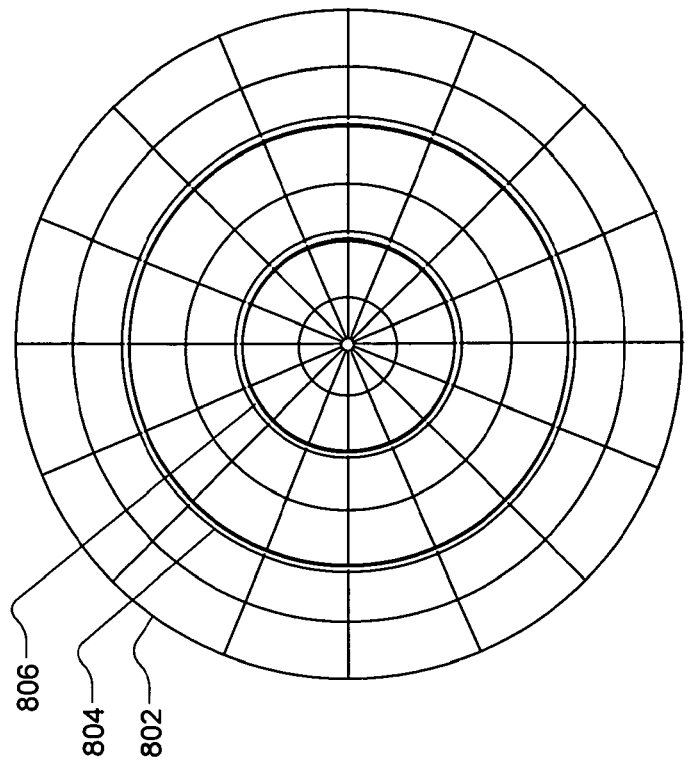
FIG. 8 shows an illustrative flattened view of nested cylindrical surfaces.

The three-dimensional view shown in FIG. 7D may be contrasted with a flattened view of the shells as shown in FIG. 8. Although the data can be viewed and correlated between the shells 802-806, a mental leap is required to visualize the spatial relationships between the data in the different shells. Nevertheless, the flattened view of FIG. 8 may be suitable for some situations.

Figure 9B:
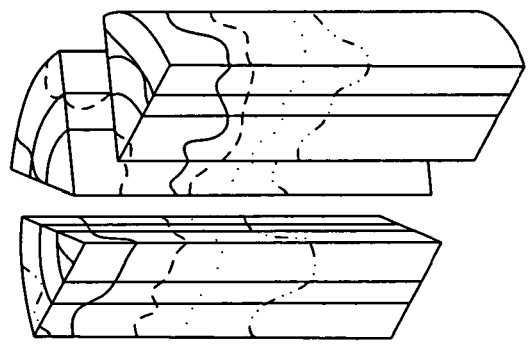
FIGS. 9A-9B show illustrative sectioned-solid views.
Figure 9A:

FIG. 9A shows the volumetric data as a cross-sectioned solid made up of volumetric pixels ("voxels") that are colored to represent the parameter values. The viewer is able to explore the spatial relationships of the data by moving and/or rotating the cross-section to make different portions of the interior viewable. FIG. 9B shows a similar view in which the solid is split into multiple wedges to make more of the interior viewable.

With the shells and solids and other visualizations disclosed herein, the voxels may be colored to represent parameter values. In addition, or alternatively, the voxels may be given transparency values to make invisible all voxels having parameter values outside a selected range. This approach demonstrates iso-property zones and connectedness that may be useful for mapping beds, faults, etc. Where it is the gradients that are of primary interest, the low-gradient areas may be made transparent. In this manner, opacity and, if desired, color can be used to highlight regions of interest, thereby providing more efficient guidance for geosteering and/or reservoir analysis.

Figure 10:
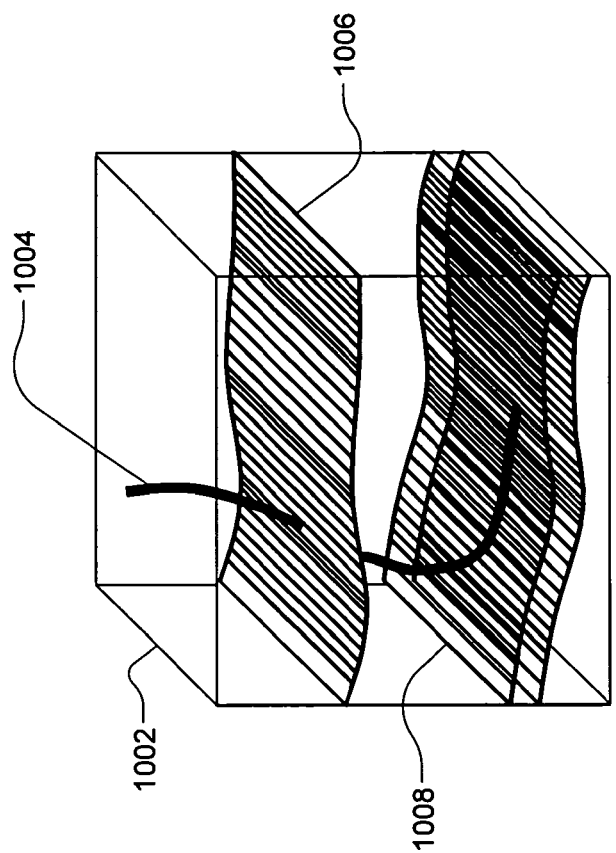
FIG. 10 shows an illustrative data cube view.

FIG. 10 shows a three-dimensional visualization that integrates different types of information in one image. The spatial cube 1002 combines surveying, petrophysical modeling, well logging, and well planning data. Seismic survey data is used to map out formation beds and fault zones, and processed to identify certain rock characteristics. Regions of interest are displayed such as bed 1006 and potential pay zone 1008. As the borehole is drilled, a borehole path 1004 is charted. As logging data is gathered, the earth model is updated and reflected by suitable changes to the display. From the volumetric data gathered by the logging tools, it should be possible to determine where the tool is in a formation, and from that, determine which visualization data (e.g. which depths of investigation) would be most useful to send in real time.

Numerous variations and modifications will become apparent to those skilled in the art once the above disclosure is fully appreciated. It is intended that the following claims be interpreted to embrace all such variations and modifications.

We claim:

1. A logging method that comprises: receiving formation measurements from at least one logging tool, wherein the formation measurements are volumetric data measurements including at least one of a resistivity, a density, and a porosity measurement, wherein said received volumetric data measurements are determined by calculating differences between measured data values; and displaying a three-dimensional holographic representation of the formation, wherein the representation shows the volumetric data's dependence on axial distance, azimuth, and radial distance.

2. The method of claim 1, wherein said volumetric data measurements are averaged from higher-resolution volumetric measurements.

3. The method of claim 1, further comprising receiving tool position and orientation measurements that are associated with said formation measurements.

4. The method of claim 1, wherein the representation shows formation property values with variable transparency.

5. The method of claim 1, wherein formation regions having property values within a specific range are represented as being transparent.

6. The method of claim 1, wherein the representation shows gradients in formation property values, and wherein formation regions having gradients below a given threshold are represented as being substantially transparent.

7. A logging method that comprises: receiving formation measurements from at least one logging tool, wherein the formation measurements are volumetric data measurements including at least one of a resistivity, a density, and a porosity measurement, wherein said received volumetric data measurements are determined by calculating differences between measured data values; and displaying a stereoscopic representation of the formation, wherein the representation shows the volumetric data's dependence on axial distance, azimuth, and radial distance.

8. The method of claim 7, wherein said volumetric data measurements are averaged from higher-resolution volumetric measurements.

9. The method of claim 7, further comprising receiving tool position and orientation measurements that are associated with said formation measurements.

10. The method of claim 7, wherein the representation shows formation property values with variable transparency.

11. The method of claim 7, wherein formation regions having property values within a specific range are represented as being transparent.

12. The method of claim 7, wherein the representation shows gradients in formation property values, and wherein formation regions having gradients below a given threshold are represented as being substantially transparent.

* * * * *